Patented Feb. 28, 1933

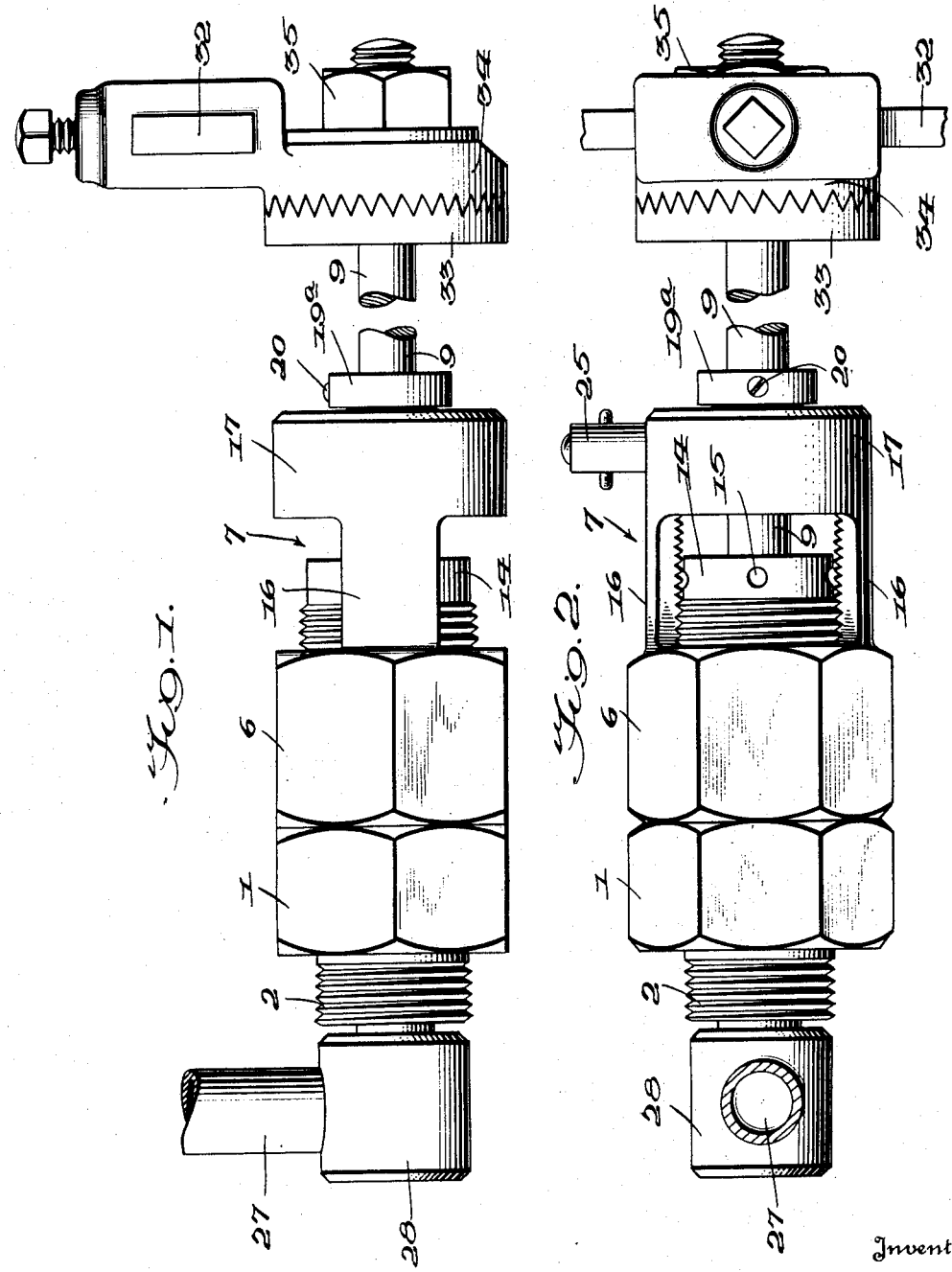

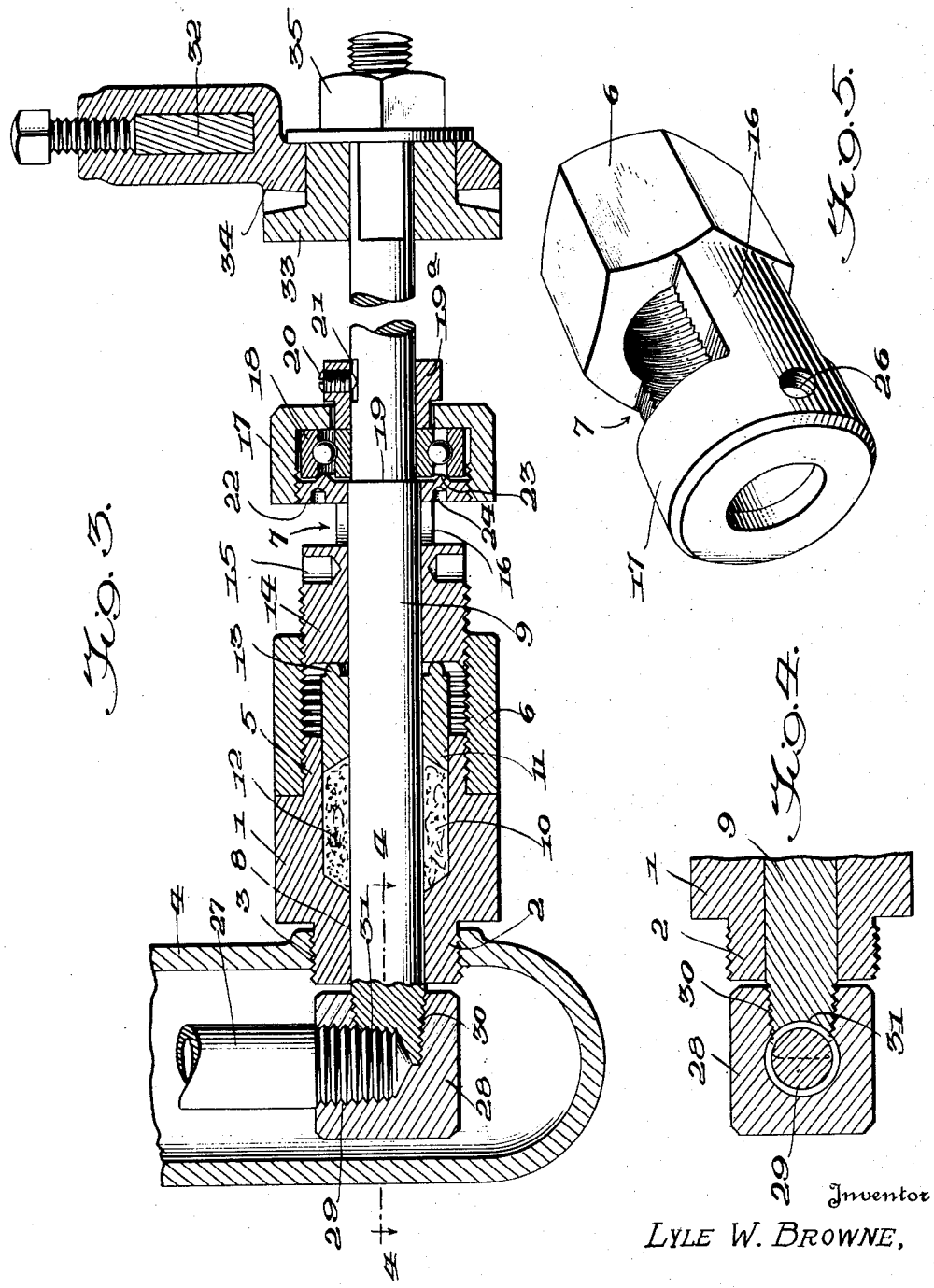

1,899,848

UNITED STATES PATENT OFFICE

LYLE W. BROWNE, OF MARSHALLTOWN, IOWA, ASSIGNOR TO THE FISHER GOVERNOR COMPANY, OF MARSHALLTOWN, IOWA

STUFFING BOX AND BEARING UNIT

Application filed June 6, 1931. Serial No. 542,655.

My invention consists in new and useful improvements in a stuffing box unit and bearing supporting means or rotary shaft journaling assembly and has for its object to provide a compact structure, the parts of which have been particularly designed to the end of simplicity and economy of manufacture in that standard material may be utilized in their construction.

Another object of my invention is that the unit or the various parts thereof may be adjusted or removed with the greatest of ease.

A further object of my invention is to provide a novel manner of locking the end of the rotary shaft or stem to a float arm or the like when the device is employed in connection with apparatus of this character.

Another object of the invention is to provide an improved yoke for supporting an outboard bearing for the shaft, the base of said yoke being designed to support the stuffing box compression plug thus reducing the number of parts and greatly simplifying the construction and operation of the unit.

A still further object of my invention is the improved bearing race follower or adjusting disc, which is applied to the head of the yoke before mentioned.

With the above and other objects in view which will appear as the description proceeds, my invention consists in the novel features herein set forth, illustrated in the accompanying drawings, and more particularly pointed out in the appended claims.

Referring to the drawings in which numerals of like character designate similar parts throughout the several views, Fig. 1 is a view in side elevation showing the assembled unit.

Fig. 2 is a top plan view taken at right angles to Fig. 1.

Fig. 3 is a view similar to Fig. 1 with all parts shown in section to illustrate the interior of the unit. In this view I have added a portion of a float cage in order to show the relative position of the unit when applied to this type of apparatus.

Fig. 4 is a sectional view taken on line 4—4 of Fig. 3 to further illustrate my improved means for locking the end of the rotary stem to the float arm, and Fig. 5 is a detail perspective of the bearing supporting yoke, per se.

It will be here noted that while I have shown in the drawings and am about to describe my invention as applied to the float arm and cage of a liquid level control apparatus, I in no way intend to limit myself to this particular application, as my invention will obviously function with equal facility with various different types of apparatus wherein it is necessary to provide packing and anti-friction means for a valve stem or rotary shaft.

The invention will be best understood by referring to Fig. 3 of the drawings wherein 1 represents the body of the stuffing box which is preferably composed of stainless steel or other suitable corrosive-resisting material, its outer face being either squared or hexagonal in shape to accommodate a suitable wrench. One end of the body 1 is reduced and threaded as at 2 to engage corresponding threads in an opening 3 in the float cage 4 or valve bonnet or other device to which the stuffing box unit is applied, its other end being reduced and threaded as at 5 to receive the internally threaded base 6 of the yoke 7 hereinafter described more in detail. The body 1 is bored centrally and longitudinally as at 8 to receive the rotary shaft or stem 9, said bore being enlarged toward one end of the body to form an annular packing chamber 10, the inner extremity of which is beveled or inclined toward the shaft 9.

11 represents an annular gland, the inner and outer faces of which are smooth and machined to fit snugly but slidably within the end of the packing chamber 10 and around the shaft 9, the inner end of said gland being inwardly beveled or inclined toward said shaft in a direction opposite to the beveled inner extremity of the packing chamber 10, whereby when the gland 11 is forced inwardly in the chamber 10 as hereinafter set forth, the packing 12 in said chamber will be compressed and wedged with uniform pressure around the shaft. It will be noted that while I have shown and described the inner extremities of the packing chamber and gland as having inclined or beveled surfaces, they may be otherwise formed, if desired, and still come within the spirit of my invention. The outer end of the gland 11 projects beyond the chamber 10 into the interior of the base 6 of the yoke, and is provided with an annular raised portion 13, the outer face of which is preferably rounded to present a minimum of friction surface for abutment with the inner end of a compression plug 14.

This compression plug 14 is externally threaded to engage the internal threads in the base 6 and is centrally bored in line with the bore 8 in the body 1, to accommodate the rotary shaft 9, said plug projecting sufficiently beyond the base 6 to allow for periodic rotational adjustment in compressing the gland 11 and packing 12. The plug 14 may be provided with recesses or indentures 15 to accommodate a suitable tool for rotating the same.

As before stated, the yoke 7 comprises a base 6 which is screwed onto the reduced end 5 of the body 1. The outer face of this base 6 is preferably squared or hexagonal in shape to correspond with the face of the body 1 and to facilitate the application of a wrench or other tool which may be employed in assembling the unit. Integral with the base 6 and projecting longitudinally therefrom is the yoke proper which consists of a pair of arms or extensions 16 which carry at their outer ends an annular bearing housing 17 for the combined radial and thrust bearing assembly 18. The inner faces of these extensions 16 are provided with continuations of the threads in the base 6, at least for a portion of their length, for engaging the threads in the plug 14, (see Fig. 2).

The shaft 9 is reduced in diameter at the end adjacent the bearing housing 17 to form a shoulder 19 and the bearing 18 is applied to this reduced portion of the shaft within the recess of the housing 17, the shoulder 19 limiting the longitudinal movement of the shaft in a direction away from the float cage 4. The particular embodiment of the invention shown in the drawings is designed for use with apparatus operating either under super-atmospheric pressure or vacuum and in order to compensate for thrust in the latter type of apparatus, which would be in the opposite direction or toward the float cage 4, I have provided a collar 19a which encircles the shaft 9 adjacent the other end of the bearing 18 and projects inwardly through a suitable opening in the end wall of the housing 17 and contacts with said bearing. This collar 19a may be adjusted and locked in position on the shaft by a set screw 20 which engages a corresponding recess 21 in the shaft. It will be noted that if the unit is to be employed with apparatus wherein the thrust on the shaft 9 will be entirely in a direction away from the float cage 4, this collar 19a may be eliminated.

In order to properly center the bearing 18 and maintain the same in alignment and concentric with the shaft 9, I have provided a follower or adjusting disc 22 which fits around the shaft 9 just over the shoulder 19, its periphery being threaded to engage complementary threads in the end of the housing 17. The inner face of the disc 22 is provided with a substantially wedge shaped protrusion or raised ring 23 which engages the bearing when the disc is screwed into the housing and retains the same in the proper alignment. In order to facilitate the adjustment of the disc 22 I may provide a plurality of recesses or indentures 24 adapted to accommodate a suitable tool.

25 represents a lubricating fitting which is screwed into the opening 26 in the bearing housing 17 whereby the bearing 18 may be lubricated to insure the free operation and accuracy of the unit.

The inner end of the shaft 9 is secured to the float arm 27 by means of an enlarged head 28, the latter being drilled and threaded at two intersecting points at right angles to one another, the threads 29 being radial of the head and adapted to receive the threaded end of the float arm 27, and the threads 30 being longitudinal of the head and adapted to receive the threaded end of the shaft 9, as shown in Figs. 3 and 4. The end of the shaft 9 is substantially semi-circularly recessed as at 31, transversely from one side, said recess being threaded to accommodate the threads on the end of the float arm 27, whereby when the shaft 30 is screwed into the head 28, the threads in the recess 31 form continuations of the threads in the recess 29 in the head, and when the float arm is screwed into the threads 29 as shown in Fig. 3, the shaft 9 is locked against rotation.

The outer end of the shaft 9 is connected to a suitable valve operating leverage 32 or it may be directly connected to the valve itself, the arrangement shown in the drawings comprising two complimentary serrated discs 33 and 34 operatively locked on the squared end of the shaft 9 by a nut 35 whereby the relative position of the lever 32 with respect to the shaft 9 may be adjusted.

It will be noted that this unit is designed in such a manner that all of the inside machine operations such as boring, facing and threading may be done on one set up on a machine which assures the various elements comprising the device being machined or tooled in line with each other which is obviously essential in a structure of this kind to cut down machine expenses and to insure accuracy in performance.

Furthermore, it will be observed that where this unit is to be employed in connection with apparatus handling corrosive gases or the like, the only elements which need be made of stainless steel or special corrosion-resisting alloy are those which are subjected to the action of these gases, the remainder of the unit being made up of cheaper material which enables the manufacturer to hold the initial cost to a minimum.

The assembly and operation of my improved unit is obvious. The stem 9 is first inserted in the opening 8 of the body 1 of the stuffing box and said body is then screwed into opening 3 in the float cage and the chamber 10 is substantially filled with any suitable compressible packing. The gland 11 is then inserted in the outer end of the chamber 10 and the base 6 of the yoke 7 is screwed onto the threaded end 5 of the body 1, after which the compression plug 14 is inserted and screwed into the yoke support 6 to a point where it has forced the gland 11 into the chamber 6 to uniformly compress the packing 12 around the shaft 9. The bearing 18 and follower 22 having been slid over the end of the shaft 9 with the yoke, are then adjusted in proper alignment on the shaft by screwing the follower 22 into the inner end of the housing 17 and the thrust collar 19a is moved into contact with the outer face of the bearing 18 and locked in place by the set screw 20, after which the valve lever 32 and its connecting elements are arranged and adjusted on the outer end of the shaft 9.

It will be seen that in this unit I have provided a device which will reduce friction to a minimum and at the same time uniformly pack the shaft so that it is impossible for fluid or gases inside of the unit to which the stuffing box is attached, to escape and attack or come in contact with the bearings. Furthermore, as before stated, my invention provides means for preventing longitudinal thrust of the rotary shaft in either direction as well as a radial bearing.

It is desirable in a device of this character that the stuffing box be designed so that old packing may be quickly removed and new packing inserted without completely disconnecting the ball bearing arrangement or valve levers. This is readily accomplished with my unit by unscrewing the set screw in the collar 19a, sliding the collar outwardly along the shaft, releasing the pressure on the plug 14, unscrewing the yoke support 6 and sliding the entire yoke and parts carried thereby outwardly on the shaft, thus affording easy access to the packing chamber 10. After the old packing is replaced with new, the parts are again assembled as hereinbefore set forth.

From the foregoing it is believed that the objects and advantages of my improved stuffing box and bearing unit may be readily understood by those skilled in the art, it being borne in mind that numerous changes may be made in the details of construction without departing from the spirit of the invention as set out in the following claims.

What I claim and desire to secure by Letters Patent is:—

1. In combination with a float arm casing or the like, a journal in one wall thereof, a shaft projecting from said casing through said journal and adapted to be connected to an actuating means within said casing, a stuffing box in said journal, a sleeve removably secured to the outer end of said journal, a series of internal threads within said sleeve, a screw threaded compression plug adapted to operatively engage said sleeve threads and lying within the radial confines of said sleeve, said plug being adapted to compress packing in said stuffing box, and a longitudinal extension on said sleeve, carrying at its outer end a bearing for the outer end of said shaft.

2. In combination with a float arm casing or the like, a journal in one wall thereof, a shaft projecting from said casing through said journal and adapted to be connected to an actuating means within said casing, a stuffing box in said journal, a sleeve removably secured to the outer end of said journal, a series of internal threads within said sleeve, a screw threaded compression plug adapted to operatively engage said sleeve threads and lying within the radial confines of said sleeve, said plug being adapted to compress packing in said stuffing box, means on said plug adapted to receive a suitable tool for rotating the same, a portion of the wall of said sleeve adjacent said compression plug being cut away to afford access to said tool engaging means, and a shaft bearing carried at the outer end of said sleeve.

3. In combination with a float arm casing or the like, a journal in one wall thereof, a shaft projecting from said casing through said journal and adapted to be connected to an actuating means within said casing, a stuffing box formed in said journal, a sleeve removably secured to the outer end of said journal and provided with a series of internal threads which extend substantially throughout its entire length, one end of said series of threads being adapted to engage complementary threads on the outer end of said journal, a screw threaded compression plug lying within the radial confines of said sleeve and adapted to engage the threads in said sleeve beyond said journal to compress packing in said stuffing box, portions of the opposite walls of said sleeve adjacent said compression plug being cut away to afford access to the latter, and a shaft bearing carried by the outer end of said sleeve.

4. A device as claimed in claim 3 wherein all of said elements lie substantially within the radial confines of said journal.

In testimony whereof I affix my signature.

LYLE W. BROWNE.